United States Patent
Huang

[19]

[11] Patent Number: 6,149,288
[45] Date of Patent: Nov. 21, 2000

[54] VEHICLE LIGHT ASSEMBLY WITH DETACHABLE AND REPLACEABLE CIRCUIT BOARD HAVING PLUG-IN TERMINAL CONNECTORS

[75] Inventor: Nan Huang Huang, Rancho Palos Verdes, Calif.

[73] Assignee: Grand General Accessories Manufacturing Inc., Compton, Calif.

[21] Appl. No.: 09/361,903

[22] Filed: Jul. 27, 1999

[51] Int. Cl.$^7$ ........................................................ F21S 8/10
[52] U.S. Cl. .......................... 362/545; 362/459; 362/487; 362/492; 362/505; 362/506
[58] Field of Search ..................... 362/459, 487, 362/492, 505, 506, 545, 543, 544, 549, 227, 800

[56] References Cited

U.S. PATENT DOCUMENTS

| | | | |
|---|---|---|---|
| 5,388,035 | 2/1995 | Bodem, Jr. ............................... | 362/545 |
| 5,567,036 | 10/1996 | Theobald et al. ........................ | 362/545 |

Primary Examiner—Sandra O'Shea
Assistant Examiner—Ismael Negron
Attorney, Agent, or Firm—Thomas I. Rozsa; Tony D. Chen; Jerry Fong

[57] ABSTRACT

A vehicle light assembly for use with a vehicle comprising a base plate, a detachable and replaceable circuit board and a lens attached to the base for covering the circuit board. The base plate has plug-in terminal connectors. Each terminal connector has a prong which extends upwardly from the base plate and a socket which extends downwardly from the base plate for connecting to a power source. The circuit board has illuminating members and ring connectors which are coupled to the illuminating members. The circuit board is installed on the base plate such that the plug-in terminal connectors on the base plate are respectively inserted into the ring connectors of the circuit board for providing electrically continuity. Therefore, when the circuit board malfunctions, the circuit board is easily replaceable by removing the lens and then the circuit board, where the old circuit board is replaced with a new circuit board, without replacing the entire light assembly and rewiring the circuit board to the electrical wiring of the vehicle.

12 Claims, 2 Drawing Sheets

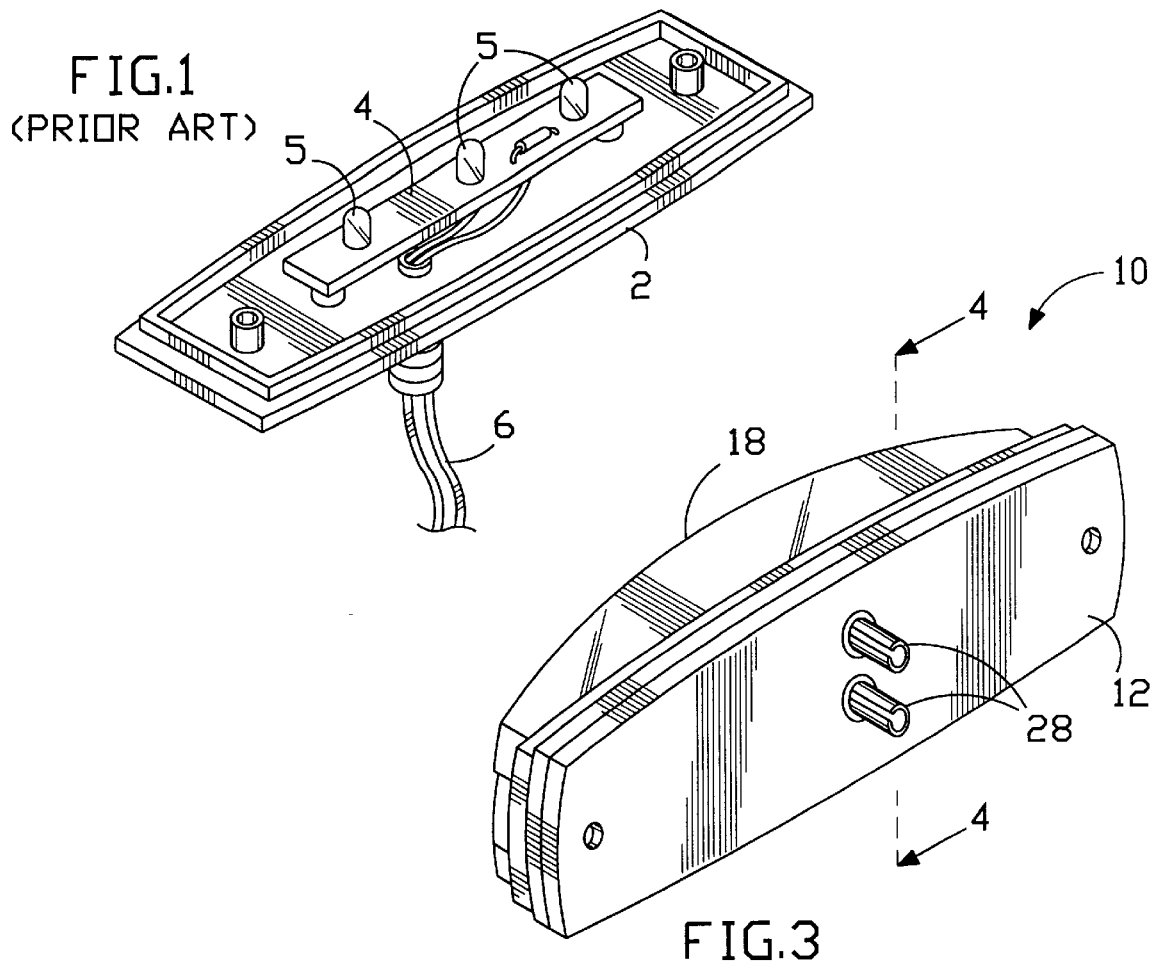
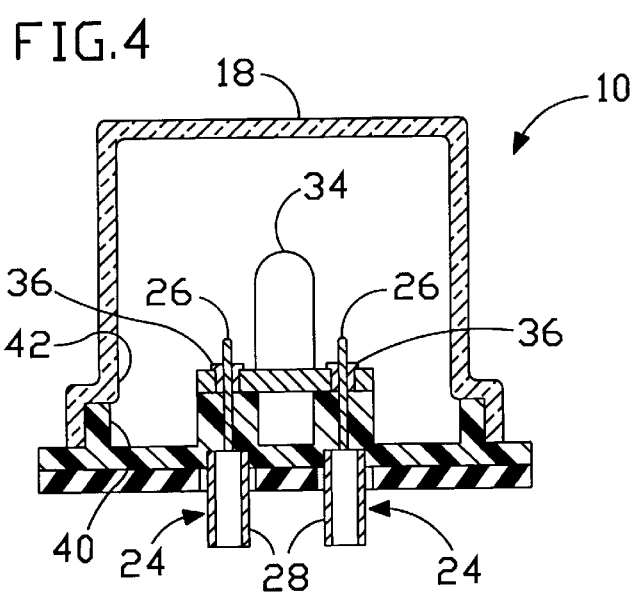

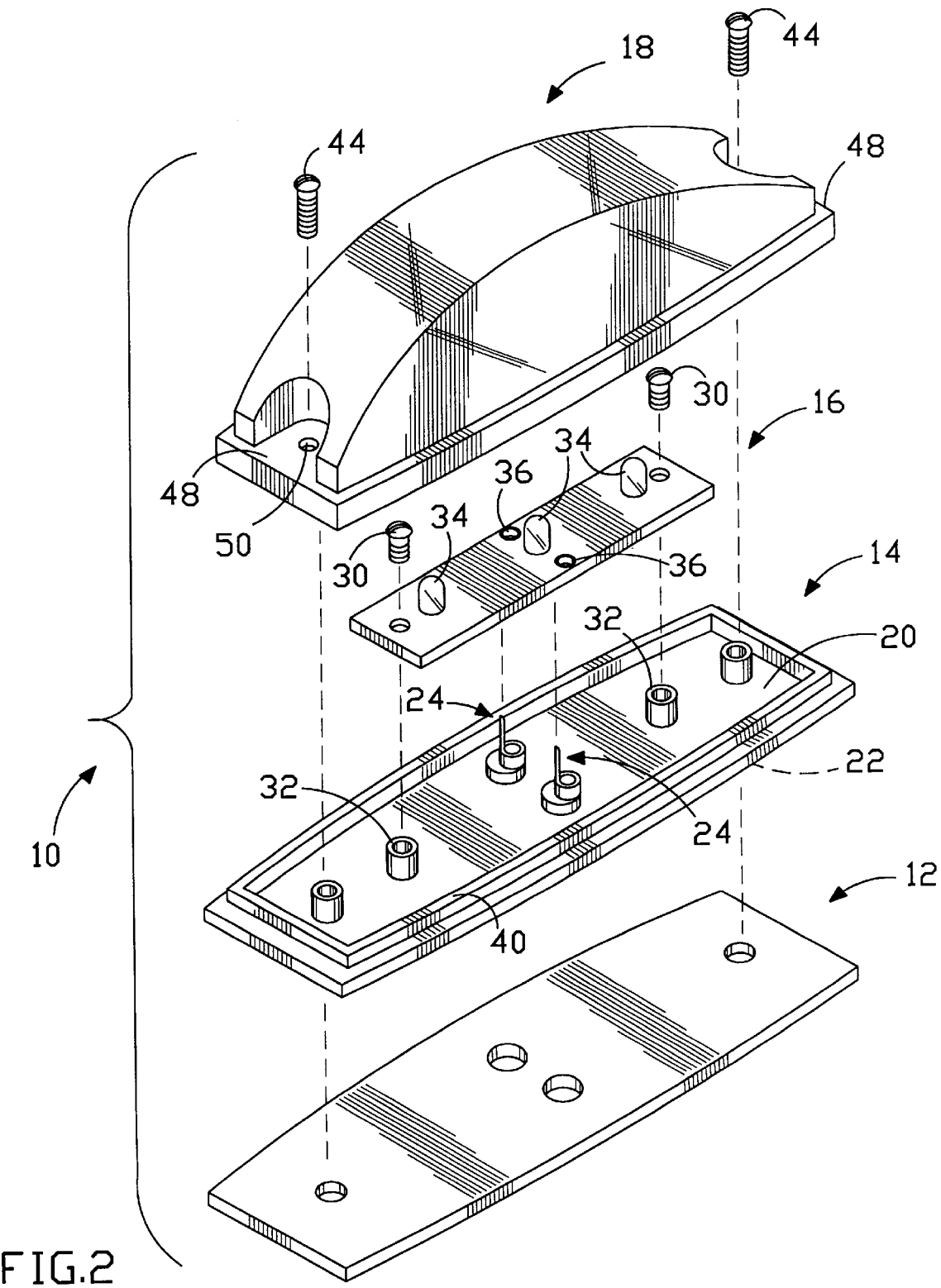

VEHICLE LIGHT ASSEMBLY WITH DETACHABLE AND REPLACEABLE CIRCUIT BOARD HAVING PLUG-IN TERMINAL CONNECTORS

BACKGROUND OF THE INVENTION

1. Field of the Invention

The present invention generally relates to the field of vehicle accessories. More particularly, the present invention relates to the field of detachable and replaceable circuit boards used in vehicle lighting accessories.

2. Description of the Prior Art

Referring to FIG. 1, there is shown a prior art vehicle light assembly which comprises a base plate 2, a circuit board 4 attached to the base plate and a lens (not shown) secured to the base plate 2 for covering the circuit board 4. The circuit board 4 has an array of light emitting diodes (LEDs) 5 and electrical wires 6 which are electrically coupled to the LEDs 5. The electrical wires 6 exit from the base plate 2 for connecting to a power source (not shown) to illuminate the LEDs 5. The disadvantage with the prior art vehicle light assembly is that the circuit board 4 is hardwired to the power source. Therefore, when the LEDs 5 malfunction, the entire assembly must be removed from the vehicle in order to replace the circuit board 4 with the LEDs 5.

It is desirable to provide a vehicle light assembly with the capability of rapidly detaching and replacing the circuit board with a new circuit board when the LEDs are malfunctioning.

SUMMARY OF THE INVENTION

The present invention is a unique vehicle light assembly which comprises a base plate, a detachable and replaceable circuit board and a lens attached to the base for covering the circuit board.

In the present invention vehicle light assembly, the base plate has plug-in terminal connectors. Each terminal connector has a prong which extends upwardly from the base plate and a socket which extends downwardly from the base plate for connecting to a power source. The circuit board has illuminating means and ring connectors which are coupled to the illuminating means. The circuit board is installed on the base plate such that the plug-in terminal connectors on the base plate are respectively inserted into the ring connectors of the circuit board for providing electrically continuity. Therefore, when the circuit board malfunctions, the circuit board is easily replaceable by removing the lens and then the circuit board, where the old circuit board is replaced with a new circuit board, without replacing the entire light assembly and rewiring the circuit board to the electrical wiring of the vehicle.

It is an object of the present invention to provide a vehicle light assembly with a detachable and replaceable circuit board, where the circuit board has illuminating means and ring connectors which are electrically coupled to the illuminating means.

It is also an object of the present invention to provide plug-in terminal connectors on a base plate, where the plug-in terminal connectors are plugged into the ring connectors on the detachable and replaceable circuit board, such that the circuit board can easily be replaced with a new circuit board when the illuminating means malfunction.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of a prior art circuit board attached to a base plate of a vehicle light assembly;

FIG. 2 is an exploded perspective view of the present invention vehicle light assembly with a detachable and replaceable circuit board having plug-in terminal connectors;

FIG. 3 is a rear perspective of the present invention vehicle light assembly; and FIG. 4 is an enlarged cross-sectional view taken along line 4—4 of FIG. 3.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 2, 3 and 4, there is shown at 10 the present invention vehicle light assembly adapted to be mounted onto a vehicle (not shown), such as a passenger automobile, truck, etc. The light assembly 10 comprises a rubber gasket 12, a generally rectangular shaped base plate 14, a detachable and replaceable printed circuit board 16, and a generally hollow elliptical shaped lens 18. The gasket 12 is provided to be used as a joint for providing a leakproof attachment to the vehicle. The base plate 14 has a front side 20, a rear side 22 and a pair of electrical terminals 24. Each electrical terminal 24 is snap fitted or attached by other suitable means to the base plate 14, where one end is formed with a prong 26 which extends upwardly from the front side 20 of the base plate 14 and the other end is formed with a socket 28 which extends downwardly from the rear side 22 of the base plate 14 (see FIG. 3) for connection to a power source (not shown) by a conventional electrical plug or other suitable means (not shown).

The detachable and replaceable circuit board 16 comprises illuminating means 34, preferably light emitting diodes (LEDs), which are mounted to the front side of the circuit board 16. A pair of spaced apart ring contacts 36 are affixedly secured to the circuit board 16 and electrically coupled to the illuminating means 34. The detachable and replaceable circuit board 16 is secured to the front side 20 of the base plate 14 by two screws 30 which are respectively and threadedly engaged with two threaded posts 32 which are integrally formed with the base plate 14. The prongs 26 of the base plate 14 are respectively inserted into the ring contacts 36 of the circuit board 16 for providing electrical continuity.

The lens 18 is snap fitted to the base plate 14 for covering the circuit board 16, where a perimeter flange 40 of the base plate 16 abuts against the interior sidewall 42 of the lens 18 to secure the lens to the base plate. The lens 18 has two flat mounting portions 48, where two screws 44 are inserted through the openings 50 (only one is shown) provided thereto, which in turn are inserted through respective holes on the base plate 14 and the gasket 12 to secure the entire vehicle light assembly 10 to the vehicle body.

When the circuit board 16 malfunctions, the circuit board 16 is easily replaceable by removing the lens 18 and then the circuit board 16 is removed and replaced with a new circuit board 16 without the need of rewiring the circuit board to the electrical wires of the vehicle.

Defined in detail, the present invention is a vehicle light assembly, comprising: (a) a generally rectangular shaped base plate having a front side, a rear side, and a pair of spaced apart openings therethrough; (b) a pair of terminal contacts respectively secured to the base plate through the pair of openings, each terminal contact having a prong extending upwardly from the front side of the base plate and a socket extending downwardly from the rear side of the base plate for connection to a vehicle power source; (c) a detachable and replaceable circuit board having a plurality of light emitting diodes (LEDs) and a pair of spaced apart ring contacts electrically coupled to the plurality of LEDs, the circuit board detachably attached to the front side of the base plate such that the prong of each the terminal contact of the base plate is inserted into a respective one of the pair of ring contacts to provide electrically continuity; and (d) a lens attached to the base plate for covering the circuit board; (e) whereby when the circuit board malfunctions, the circuit board is easily replaceable by removing the lens and replacing the malfunctioned circuit board with a new circuit board without rewiring and replacement of the entire light assembly.

Defined broadly, the present invention is a vehicle light assembly, comprising: (a) a base plate having a front side and a rear side; (b) at least two terminal contacts secured to the base plate, each terminal contact having a prong extending upwardly from the front side of the base plate and a socket extending downwardly from the rear side of the base plate for connection to a vehicle power source; (c) a detachable and replaceable circuit board having illuminating means and at least two ring contacts electrically coupled to the illuminating means, the circuit board detachably attached to the front side of the base plate such that the prong of the each terminal contact is inserted through a respective one of the at least two ring contacts to provide electrically continuity; and (d) a lens attached to the base plate for covering the circuit board; (e) whereby when the circuit board malfunctions, the circuit board is easily replaceable by removing the lens and replacing the malfunctioned circuit board with a new circuit board without rewiring and replacement of the entire light assembly.

Defined more broadly, the present invention is a vehicle light assembly, comprising: (a) a base plate; (b) at least one first contact member having first contacting means extending upwardly from a front side of the base plate and second contacting means extending downwardly from a rear side of the base plate for connection to a vehicle power source; (c) a detachable and replaceable circuit board having illuminating means and at least one second contact member electrically coupled to the illuminating means, the circuit board detachably attached to the base plate such the at least one second contact member couples with the first contacting means of the at least one first contact for providing electrically continuity; and (d) a lens attached to the base plate for covering the circuit board; (e) whereby when the circuit board malfunctions, the circuit board is easily replaceable by removing the lens and replacing the malfunctioned circuit board with a new circuit board without rewiring and replacement of the entire light assembly.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A vehicle light assembly, comprising:
   a. a base plate;
   b. at least one first contact member having first contacting means extending upwardly from a front side of said base plate and second contacting means extending downwardly from a rear side of said base plate for connection to a vehicle power source;
   c. a detachable and replaceable circuit board having illuminating means and at least one second contact member electrically coupled to the illuminating means, the circuit board detachably attached to said base plate such said at least one second contact member couples with said first contacting means of said at least one first contact for providing electrically continuity; and
   d. a lens attached to said base plate for covering said circuit board;
   e. whereby when said circuit board malfunctions, said circuit board is easily replaceable by removing said lens and replacing said malfunctioned circuit board with a new circuit board without rewiring and replacement of the entire light assembly.

2. The light assembly in accordance with claim 1, further comprising a gasket for providing a leakproof attachment to a body of a vehicle.

3. The light assembly in accordance with claim 1, wherein said illuminating means includes a plurality of light emitting diodes.

4. The light assembly in accordance with claim 1, wherein said lens is generally an elliptical shape.

5. The light assembly in accordance with claim 1, wherein said first contacting means of said at least one first contact member is a prong.

6. The light assembly in accordance with claim 1, wherein said second contacting means of said at least one first contact member is a socket.

7. The light assembly in accordance with claim 1, wherein said at least one second contact member is a ring.

8. A vehicle light assembly, comprising:
   a. a base plate having a front side and a rear side;
   b. at least two terminal contacts secured to said base plate, each terminal contact having a prong extending upwardly from said front side of said base plate and a socket extending downwardly from said rear side of said base plate for connection to a vehicle power source;
   c. a detachable and replaceable circuit board having illuminating means and at least two ring contacts electrically coupled to the illuminating means, the circuit board detachably attached to said front side of said base plate such that said prong of said each terminal contact is inserted through a respective one of the at least two ring contacts to provide electrically continuity; and d. a lens attached to said base plate for covering said circuit board;

e. whereby when said circuit board malfunctions, said circuit board is easily replaceable by removing said lens and replacing said malfunctioned circuit board with a new circuit board without rewiring and replacement of the entire light assembly.

9. The light assembly in accordance with claim 8, further comprising a gasket for providing a leakproof attachment to a body of a vehicle.

10. The light assembly in accordance with claim 8, wherein said illuminating means includes a plurality of light emitting diodes.

11. A vehicle light assembly, comprising:

a. a generally rectangular shaped base plate having a front side, a rear side, and a pair of spaced apart openings therethrough;

b. a pair of terminal contacts respectively secured to said base plate through said pair of openings, each terminal contact having a prong extending upwardly from said front side of said base plate and a socket extending downwardly from said rear side of said base plate for connection to a vehicle power source;

c. a detachable and replaceable circuit board having a plurality of light emitting diodes (LEDs) and a pair of spaced apart ring contacts electrically coupled to the plurality of LEDs, the circuit board detachably attached to said front side of said base plate such that said prong of each said terminal contact of said base plate is inserted into a respective one of the pair of ring contacts to provide electrically continuity; and d. a lens attached to said base plate for covering said circuit board;

e. whereby when said circuit board malfunctions, said circuit board is easily replaceable by removing said lens and replacing said malfunctioned circuit board with a new circuit board without rewiring and replacement of the entire light assembly.

12. The light assembly in accordance with claim 11, further comprising a gasket for providing a leakproof attachment to a body of a vehicle.

* * * * *